(12) United States Patent
Jensen et al.

(10) Patent No.: US 6,290,038 B1
(45) Date of Patent: Sep. 18, 2001

(54) ELASTOMER DAMPER

(75) Inventors: William S. Jensen, Apex; Scott K. Miller, Willow Spring, both of NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/510,551

(22) Filed: Feb. 22, 2000

Related U.S. Application Data

(63) Continuation-in-part of application No. 09/277,886, filed on Mar. 29, 1999.

(51) Int. Cl.⁷ .................................................. B60T 7/12
(52) U.S. Cl. ........................................... 188/381; 267/134
(58) Field of Search .................................. 188/381, 271, 188/322.22, 322.15; 267/134

(56) References Cited

U.S. PATENT DOCUMENTS

| | | | |
|---|---|---|---|
| 2,562,595 | 7/1951 | Blue | 267/1 |
| 2,683,015 | 7/1954 | Campbell | 248/358 |
| 2,955,795 | 10/1960 | Painter | 248/358 |
| 3,198,506 | 8/1965 | Thorn | 267/1 |
| 3,990,542 | 11/1976 | Dent et al. | 188/67 |
| 4,425,836 * | 1/1984 | Pickrell | 91/405 |
| 4,759,428 * | 7/1988 | Seshimo | 188/322.22 |
| 4,765,444 | 8/1988 | Bauer et al. | 188/129 |
| 4,877,222 * | 10/1989 | Davis | 188/322.22 |
| 4,925,165 | 5/1990 | Sketo | 267/221 |
| 4,957,279 | 9/1990 | Thorn | 267/140.5 |
| 4,964,516 | 10/1990 | Thorn | 267/140.1 |
| 4,979,595 | 12/1990 | Paton | 188/129 |
| 5,174,551 | 12/1992 | Mintgen | 267/120 |
| 5,183,137 | 2/1993 | Siwek et al. | 188/381 |
| 5,257,680 | 11/1993 | Corcoran et al. | 188/129 |
| 5,295,564 | 3/1994 | Stadelmann | 188/381 |
| 5,323,885 * | 6/1994 | Fukunaga et al. | 188/381 |
| 5,535,861 | 7/1996 | Young | 188/281 |
| 5,549,182 | 8/1996 | Ehrnsberger et al. | 188/129 |
| 5,595,268 | 1/1997 | Paton | 188/271 |
| 5,613,580 | 3/1997 | Young | 188/300 |
| 5,634,537 | 6/1997 | Thorn | 188/300 |
| 5,720,369 | 2/1998 | Thorn | 188/300 |

* cited by examiner

*Primary Examiner*—Robert J. Oberleitner
*Assistant Examiner*—Robert A. Siconolfi
(74) *Attorney, Agent, or Firm*—Michael M. Gnibus; James W. Wright

(57) ABSTRACT

Elastomer dampers (20) and (120) for damping movement between two relatively moveable members, such as shimmy motion between components in an aircraft landing gear assembly (10). Each damper includes a housing (24) having an internal cavity (36) with a cylindrical interior surface (34) and an opening (41), and a member assembly (28, 128) moveable relative to the housing (24) having an elongated shaft (30) received through the opening (41) with a piston head assembly (32) mounted thereon. The piston head assembly (32, 132) has a annular support element (46, 146) received over the shaft (30) with a sleeve-like elastomer member (48, 148) received over it. The elastomer member (48, 148) engages the interior surface (34) in an interference fit relationship thereby radially precompressing the elastomer element (48, 148) in the range of between about 5% and 15%. In one embodiment of piston head assembly, low friction washers (50a, 50b) are preferably positioned adjacent to the ends of the elastomer member (48) and the support member (46). Rigid washers (54a, 54b) may be provided to abut and support the low friction washers (50a, 50b). The elastomer member (48) preferably has grooves (51) forming a plurality of ribs (53) that are preferably axially oriented. In another embodiment, elastomer member 148 is directly bonded to annular support element 146 and includes at least one continues helical groove (151) around the circumference.

13 Claims, 12 Drawing Sheets

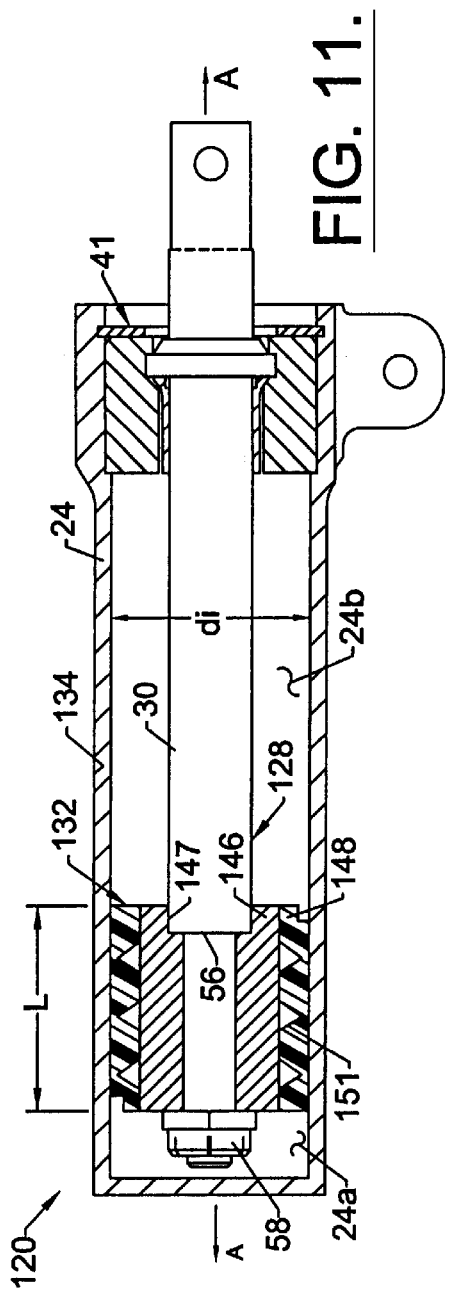
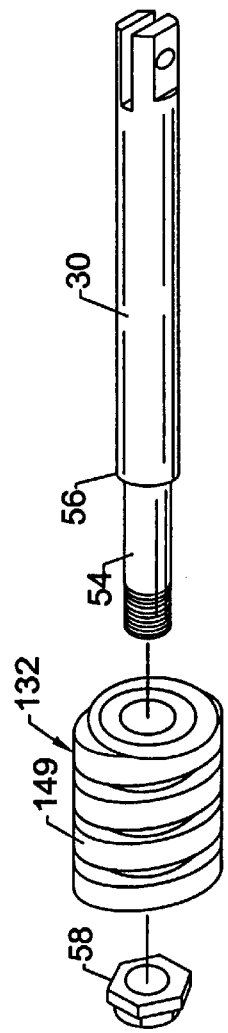
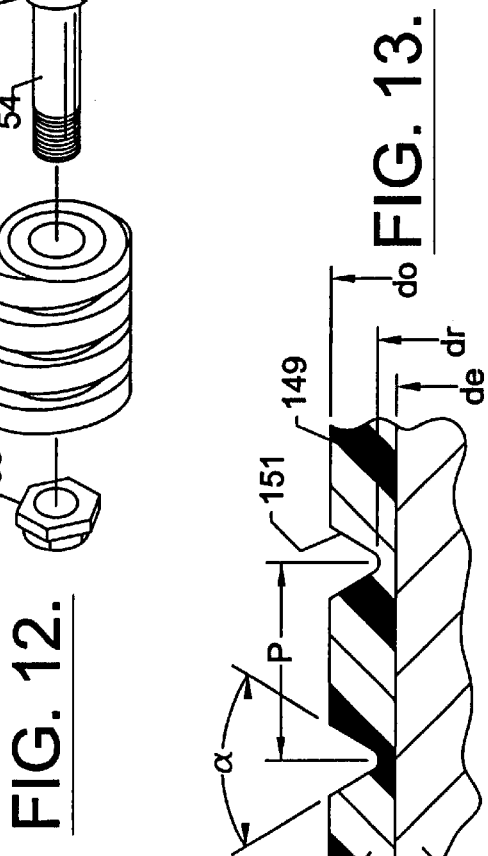
FIG. 11.
FIG. 12.
FIG. 13.

ELASTOMER DAMPER

RELATED APPLICATION

The present invention is a continuation-in-part of U.S. application Ser. No. 09/277,886, to William S. Jensen and Scott K. Miller, filed Mar. 29, 1999.

FIELD OF THE INVENTION

The invention relates to the area of damping devices. Specifically, it relates to devices employing an elastomer element for generating damping forces.

BACKGROUND OF THE INVENTION

Dampers and shock-absorbers are known which use a hydraulic fluid as the working medium to create damping forces to control or minimize shock and/or vibration. Typically, the damping forces are generated by pressures resisting movement between operative components of the damper or shock absorber. For example, in aircraft landing gear applications, the current state of the art is to attach a fluid damper between components of the landing gear assembly to damp shimmy motions thereof. Although these fluid devices perform acceptably, they tend to be costly and are subject to leakage thereby constituting a maintenance issue for the aircraft.

Various devices are known which utilize elastomer elements to produce a damping or locking force. In essence, the elastomer element is in friction engagement with another member and relative movement therebetween generates a quasi-frictional force or locking feature. Such devices are disclosed in U.S. Pat. No. 5,720,369 to Thorn entitled "Adjustable, Lockable Devices," U.S. Pat. No. 5,634,537 to Thorn entitled "Locking and Positioning Device," U.S. Pat. No. 5,613,580 to Young entitled "Adjustable, Lockable Strut", U.S. Pat. No. 5,535,861 to Young entitled "Dual-Rate Damper," U.S. Pat. No. 5,257,680 to Corcoran et al. entitled "Surface Effect Dampers Having Both A Hysteresis and A Frictional Component, U.S. Pat. No. 5,183,137 to Siwek et al. "Dual Rate Surface Effect Dampers" U.S. Pat. No. 4,964,516 to Thorn entitled "Damped Extended-Motion Strut," U.S. Pat. No. 4,957,279 to Thorn entitled "Fluidless Multi-Directional Motion-Damping Mount," and U.S. application Ser. No. 09/040,694 to Thorn et al. entitled "Resistance Generating Device" all of which are commonly assigned to the assignee of the present invention. Although these devices are adequate for their intended purposes, they each exhibit certain inadequacies which make them unattractive candidates for providing damping forces between relatively moveable members. In particular, many of the devices available heretofore provide damping forces that vary significantly with temperature variations.

Therefore, there is a long felt, and urgent, need for a simple, durable, maintenance free and cost effective device for providing damping forces between relatively moveable members, and in particular, a damper which is substantially temperature insensitive.

SUMMARY OF THE INVENTION

The present invention provides a damper having an elastomer element that is simple in construction and cannot leak. Moreover, the invention provides a damper having an elastomer element that is simple in construction, exhibits temperature insensitive damping, permits higher pressures at the friction interface of the damper for increasing the damping force, improves lubrication for reduced elastomer abrasion, increases viscous resistance, and provides longer damper life. The elastomer damper includes a housing and a member assembly moveable relative thereto which cooperate to produce a damping force. The damper according to the invention finds excellent utility as a shimmy damper for aircraft landing gear.

In more detail, one embodiment of the elastomer damper comprises a housing including an internal cavity having a cylindrical interior surface of a first diameter, a first closed end, and second end including an opening. The member assembly is moveable relative to the housing and includes an elongated shaft received through the opening and a piston head assembly mounted to the shaft. The piston head assembly is constructed of a support element received over the shaft, and an elastomer sleeve received over the support element; the elastomer sleeve having an outer diameter larger than the first diameter such that the elastomer sleeve engages the cylindrical interior surface in an interference fit relationship thereby radially precompressing the sleeve. The housing preferably includes an end cap with a bearing and wiper seal which engages the shaft.

The member assembly includes low friction washers which are preferably received adjacent to ends of the sleeve and the support member and position and support same. Rigid washers preferably abut and support the low friction washers. The elastomer element preferably comprises a sleeve-like member with a plurality of circular grooves therein forming a plurality of ribs. In this configuration, the grooves are oriented axially. The ribs of the elastomer sleeve, upon assembly into the housing, are precompressed radially in the range of between about 5% and about 15%, and more preferably by about 8%. Preferably, the ribs exhibit a shape factor of between about 0.3 to about 1.2 that occurs when a width-to-height ratio of the ribs is between about 0.6 to about 2.4. This combination of shape factor and precompression provides excellent damping force stability over broad temperature ranges.

According to another aspect, the invention comprises an elastomeric damper having a housing including an internal cavity with a cyindrical interior surface of a first diameter, a first closed end, and a second end having an end cap including an opening and having a bearing mounted therein. A member assembly is axially moveable relative to the housing and includes an elongated shaft received through the opening and slidably engagable with the bearing, and a piston head assembly mounted to the shaft. The piston head assembly includes an annular support element received over the shaft, and an annular elastomer sleeve including axial grooves. The sleeve is received over the annular support element; the elastomer sleeve having an outer diameter larger than the first diameter such that the annular elastomer sleeve engages the cylindrical interior surface in an interference fit relationship. Preferably, the interference fit is such that it precompresses the annular elastomer sleeve by between about 5% and about 15% of a free height of the annular elastomer sleeve.

According to another aspect, the invention comprises elastomeric damper comprising a housing including an elongated internal cavity with a cylindrical interior surface of a first diameter, a first closed end, and a second end including an end cap having an opening formed therein. A member assembly is moveable relative to the housing and includes an elongated shaft slidably received through the opening, and a piston head assembly mounted to an end of the shaft. The piston head assembly includes an annular support clement including a cylindrical outer surface received over the shaft, an annular elastomer sleeve including axial grooves forming a plurality of ribs; the sleeve being received over the cylindrical outer surface of the annular support element and wherein the elastomer sleeve has an outer diameter larger than the first diameter such that the annular elastomer sleeve engages the cylindrical interior surface in an interference fit relationship thereby precompressing the ribs by about between 5% and 15% of a free height of the annular elastomer sleeve. The invention preferably also includes low friction washers received adjacent to both ends of the sleeve and extending toward the cylindrical interior surface and stopping in relatively close proximity thereof.

In another embodiment of the elastomer damper, the surface of the elastomer sleeve in contact with the cylindrical surface of the housing includes at least one helical rib formed by a like number of continuous helical grooves communicating between the opposite ends of the housing. The sleeve is bonded directly to the annular support element of the piston head assembly which, in turn, is secured to one end of the piston shaft between a step on the shaft and a end locknut. The rib is precompressed radially in the range of about 5% and 15%, preferably 10%, to attain a proper interference fit with the housing cylinder. With a rib width-to-height ratio in the range of about 1.5 and 3.5, preferably 2.43, a rib shape factor SF in the range of about 0.75 and 1.75, preferably about 1.2, is achieved.

It is an advantage of the present invention elastomer damper that it cannot leak.

Another advantage of the invention is that it provides a damper with durable construction.

Another advantage of the invention is providing excellent damping that is relatively unchangeable over broad temperature ranges.

Another advantage of the invention is providing damping for controlling shimmy in aircraft landing gear applications.

Advantages of the damper embodiment having a helical rib sleeve are improved distribution of lubricant, higher pressures at the friction interface of the damper for increased damping force, reduced elastomer abrasion and increased viscous resistance for longer damper life, reduced stiction forces, and more usable surface area for generating damping forces.

For the aircraft landing gear application, it is another advantage of the invention that it eliminates maintenance due to seal leakage.

The above-mentioned and further features, advantages and characteristics of the present invention will become apparent from the accompanying descriptions of the preferred embodiments and attached drawings.

BRIEF DESCRIPTION OF THE DRAWINGS

The accompanying drawings form a part of the specification and illustrate an embodiment of the present invention. The drawings and description together, serve to fully explain the invention. In the drawings.

FIG. 11 is a longitudinal view in cross section, like FIG. 1, of another embodiment of the elastomer damper according to the invention;

FIG. 12 is an exploded perspective view of a member assembly in the damper of FIG. 11;

FIG. 13 is a view in cross section of a portion of a helical elastomer sleeve in the member assembly of FIG. 12.

DESCRIPTION OF THE PREFERRED EMBODIMENTS

Figure 1:
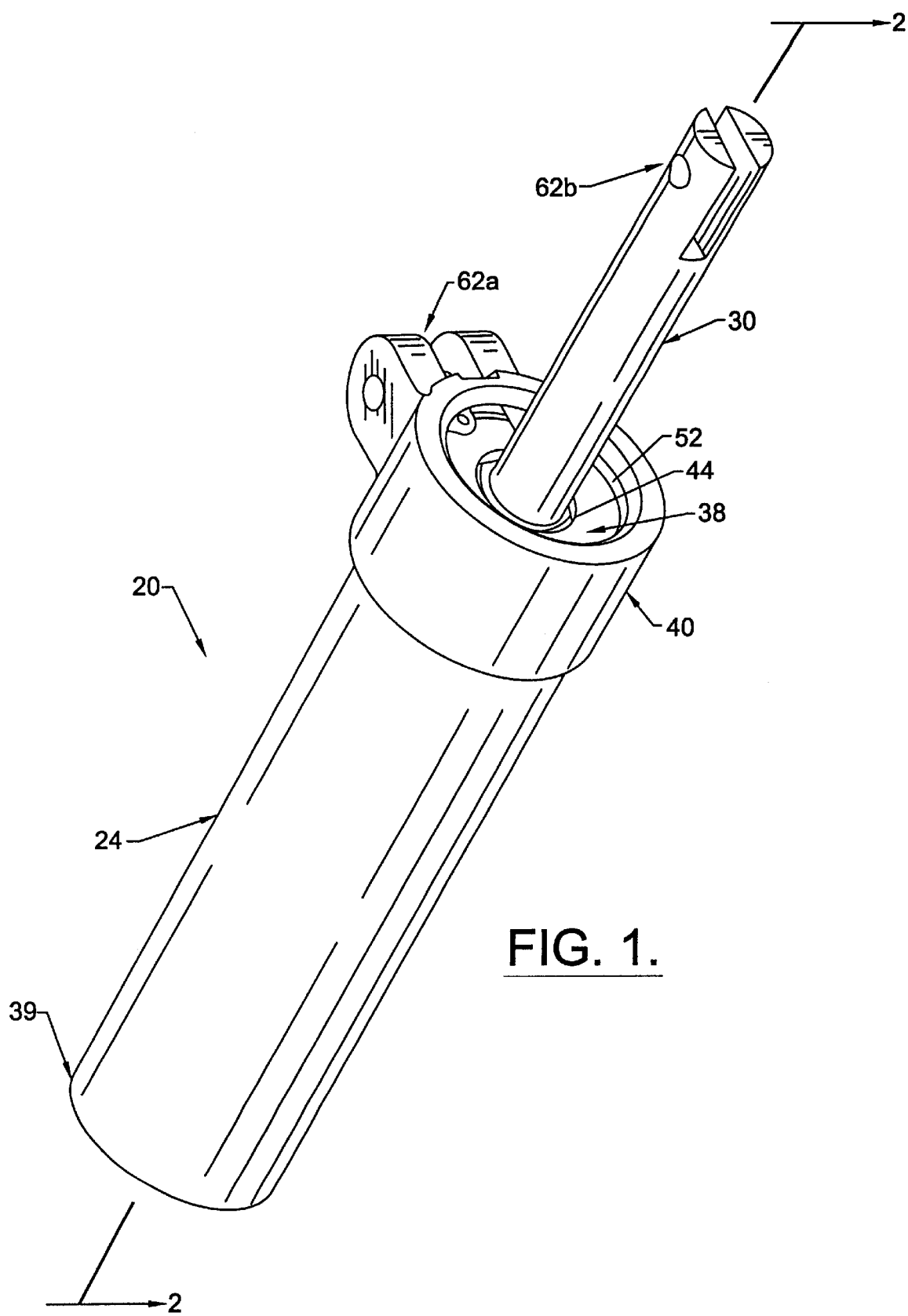
FIG. 1 is a perspective view of one embodiment of the elastomer damper in accordance with the present invention.
Figure 2:
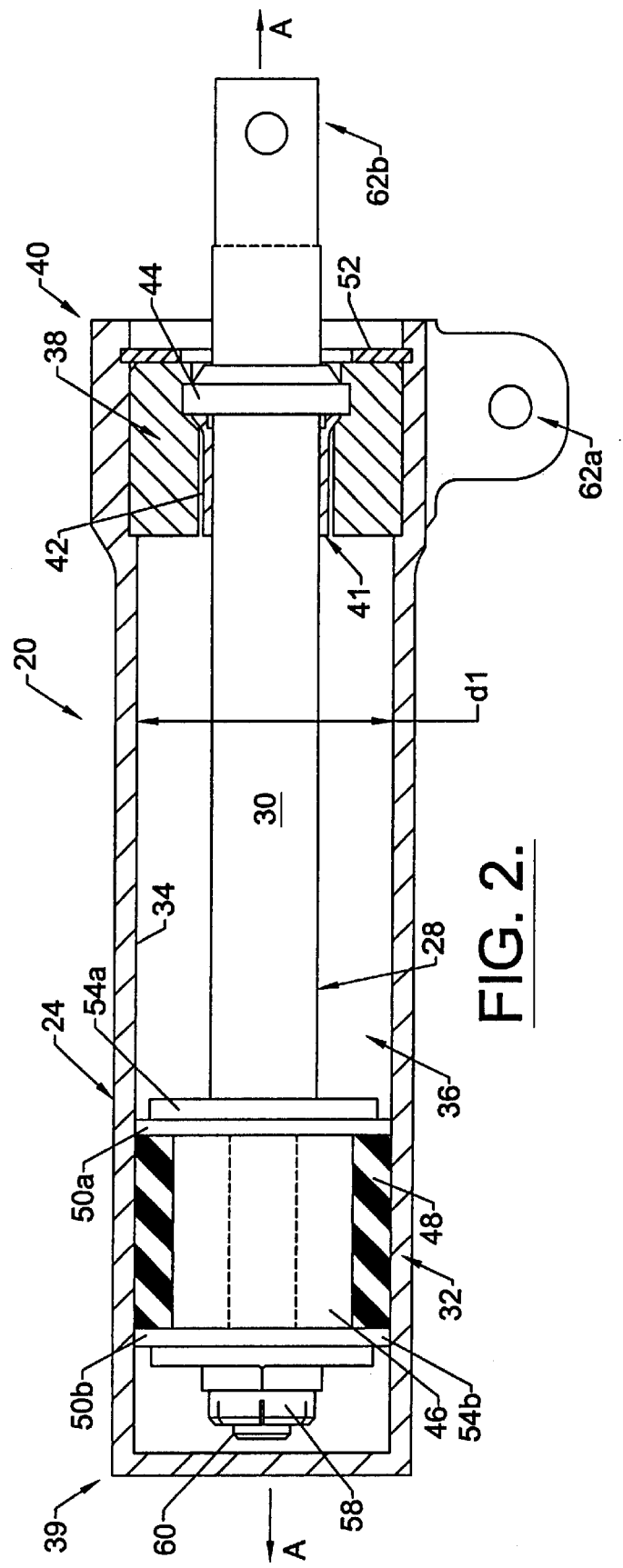
FIG. 2 is a cross sectional view of the elastomer damper taken along section line 2—2 of FIG. 1.
Figure 3:
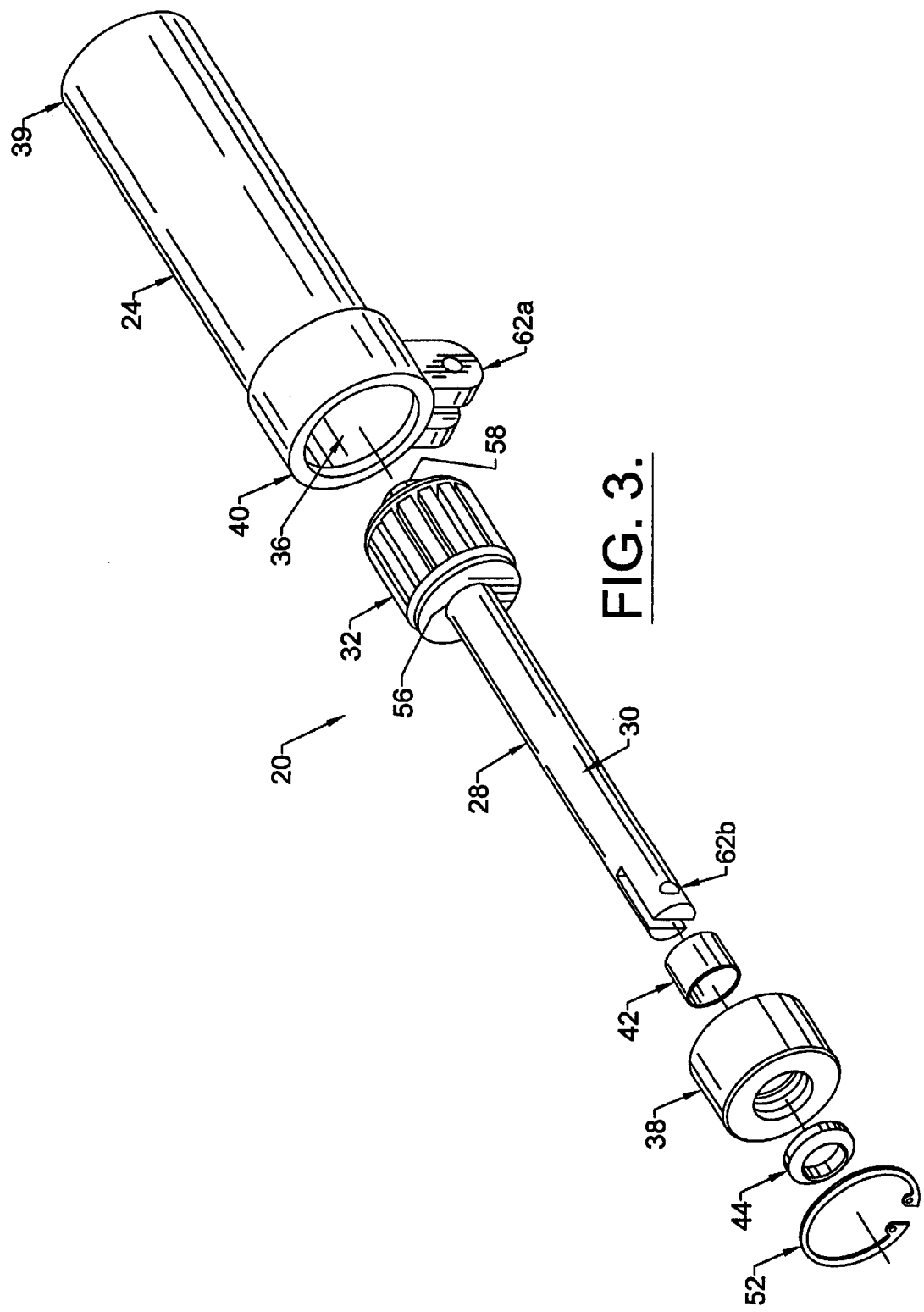
FIG. 3 is an exploded perspective view of the elastomer damper of FIG. 1.
Figure 6:
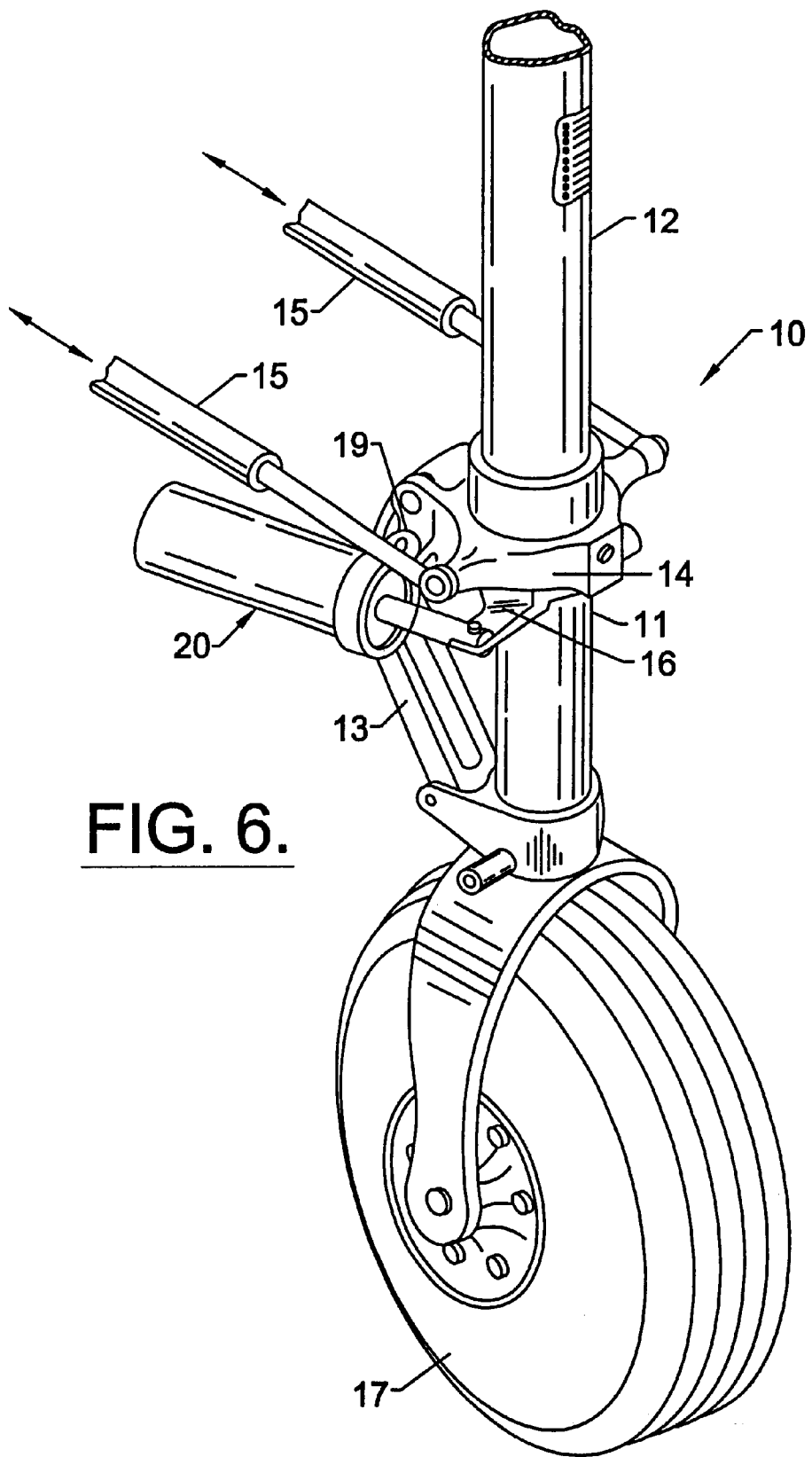
FIG. 6 is a perspective view of the elastomer damper according to the present invention installed in a landing gear assembly.

Referring now to the Drawings where like numerals denote like elements, in FIGS. 1–3, shown generally at 20, are various illustrations of one embodiment of an elastomer damper for providing a damping force between two relatively movable structures (See FIG. 6). The damper 20 includes a housing 24 and an member assembly 28 that is axially moveable (reciprocatable) relative thereto.

According to the invention, the preferably aluminum housing 24 includes a generally cylindrical internal cavity 36 having a smooth, elongated cylindrical interior surface 34 of a first diameter dl, a first closed end 39 and a second end 40 including a small diameter opening 41 formed therein. An aluminum end cap 38 of the housing 24 which includes the opening 41 is received in the second end and is retained in place by retention member 52, such as a c-clip or other suitable retaining means, such as adhesive, crimping, etc.

The member assembly 28 includes an elongated, rigid, preferably stainless steel shaft 30 received through the opening 41, and a piston head assembly 32 mounted to the axial end of shaft 30. The piston head assembly 32 further includes a support element 46, an elastomer element 48, two low friction washers 50a, 50b, and two rigid washers 54a, 54b. Received over the end of the shaft 30 is the support element 46 that preferably comprises an annular sleeve of rigid material, such as aluminum, including a cylindrical outer surface 55.

The elastomer element 48 is preferably received over the support element 48 in a slight interference fit (approximately 5% smaller diameter) and unbonded relationship. Although the elastomer element 48 may optionally be bonded to the cylindrical outer surface 55 of the support element 46. The elastomer element 48 includes an assembled outer diameter $d_2$ (when assembled over support element 46) which is larger than the first diameter $d_1$ of the housing 24, such that the elastomer element 48 engages the cylindrical interior surface 34 in an interference fit relationship. Accordingly, this interference causes the elastomer element 48 to be precompressed enough to achieve the appropriate damping level as the elastomer element slidably engages the housing 24.

The low friction washers 50a, 50b are positioned to abut the axial ends of the elastomer element 48 and substantially eliminate any axial shearing movement such that it cannot shear relative to the cylindrical wall 34 where it would behave as a spring. This achieves the maximum damping force. The washers 50a, 50b also abut the axial end of the support member 46, thus the washers serve the additional purpose of axially locating and supporting the elastomer element 48 relative to the support member 46.

The length $L_1$ of the elastomer element 48 in its free state is preferably slightly longer by approximately 0.03 inch (0.76 mm) than the length $L_2$ of the support element 46. Moreover, the elastomer sleeve 48 preferably includes an inner diameter $d_3$ that in its free state is slightly smaller than the outer diameter $d_4$ of the support element 46, thereby allowing good engagement when assembled.

The washers 50a and 50b preferably have an outer diameter dimension which is slightly smaller than the cylinder $d_1$ of the housing 24. The washers 50a and 50b then serve the additional function of preventing any substantial side loading on the elastomer element 48 should a side load be encountered. This function is accomplished by the washers smoothly sliding against the housing wall 34. A low friction material is desired for the washers to prevent scratching the wall 34 upon contact therewith. Nylon or any other suitable low-friction material may be used for the washers 50a, 50b. Abutting and supporting the low friction washers 50a, 50b of piston head assembly 32 are two rigid (e.g., steel) washers which are preferably of a slightly smaller diameter.

The elongated shaft 30 of member assembly is received through the opening 41 in the end cap 38 and engages a bearing 42 and wiper/seal 44 mounted in end cap 38. The bearing 42 comprises a metal outer sleeve with a Nylon liner and serves as an alignment guide for the member assembly 28. A suitable bearing is available as Part No. 8N8D from Thornson Industries Inc. of Washington, N.Y. A suitable wiper/seal 44 is available as part number 4615SHD500 from Parker Seal of Salt Lake City, Utah. The wiper seal 44 protects the cavity from contamination (debris and water) which may degrade the performance or durability of the damper 20. Optionally, an O-ring seal may be employed.

Figure 4:
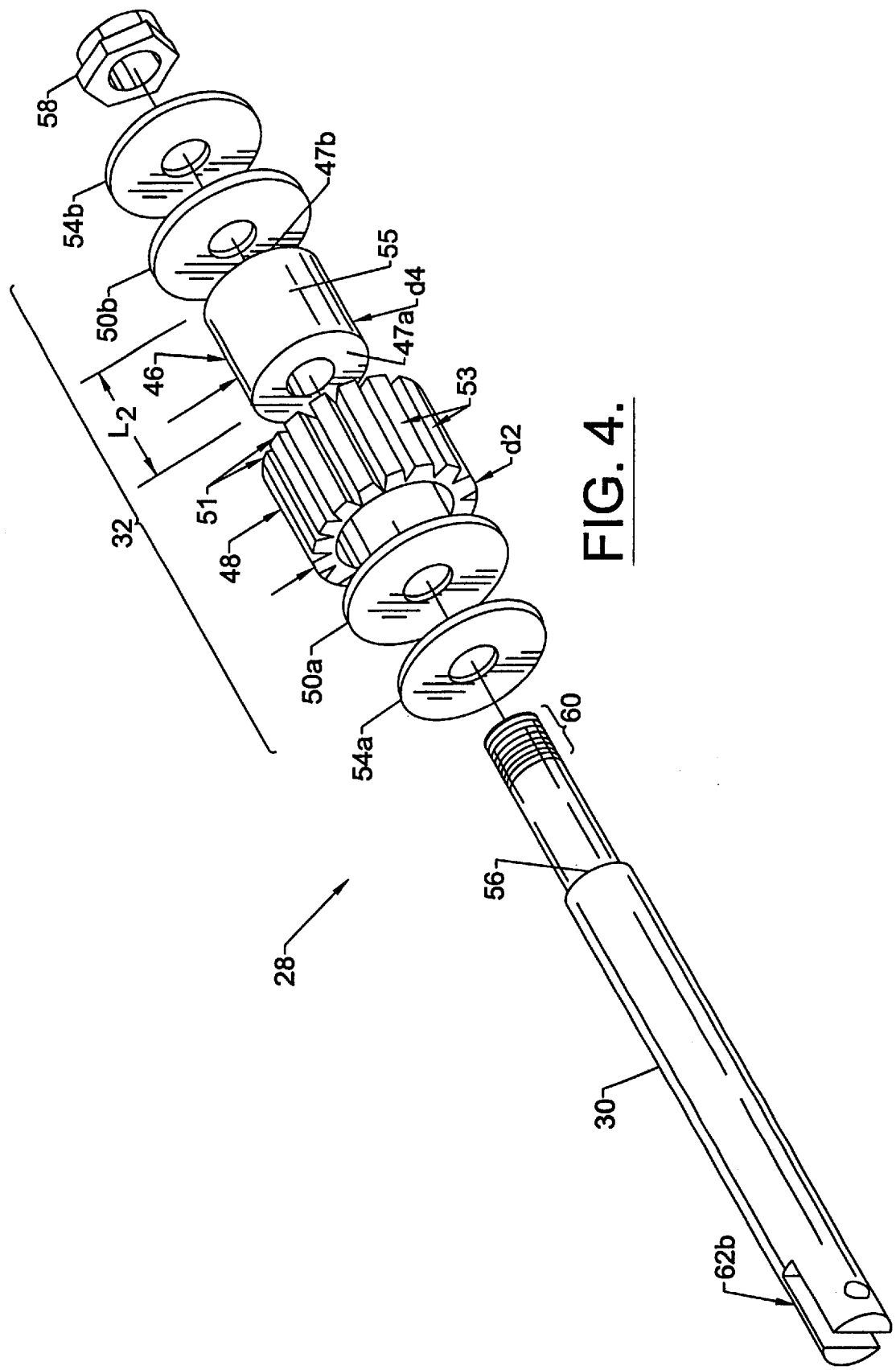
FIG. 4 is an exploded perspective view of the member assembly.

As best shown in FIGS. 3 and 4, the piston head assembly 32 of the member assembly 28 is held in place between a step 56 formed on the shaft 30 and a lock nut 58 threaded onto a threaded portion 60 of the shaft 30.

Figure 5:
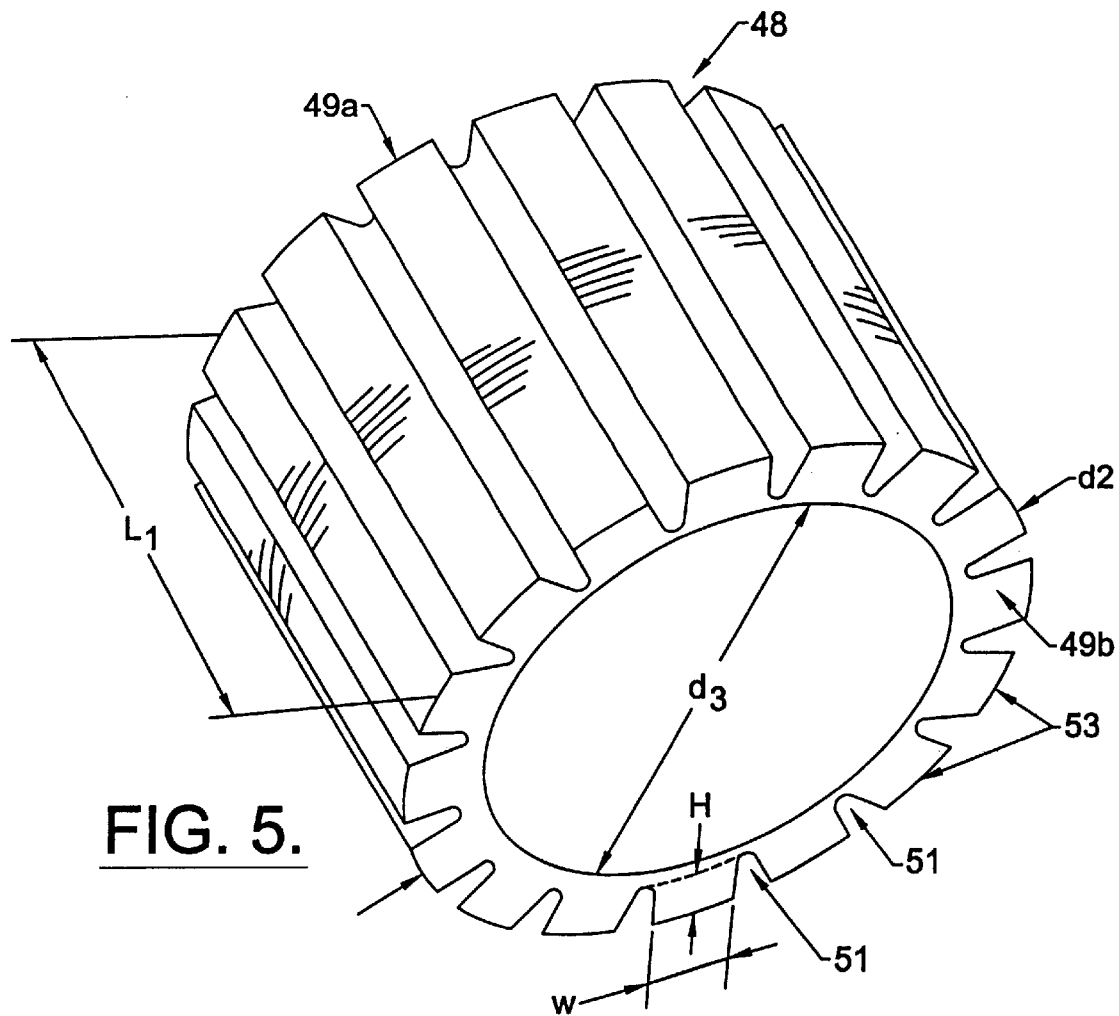
FIG. 5 is a perspective view of the elastomer element.

In FIGS. 4 and 5, the elastomer sleeve 48 is shown which has a plurality of grooves 51 formed thereon forming a plurality of ribs 53 (preferably 8–16 ribs). More or less ribs may be used if desired. Most preferably, the grooves 51 are oriented generally axially. The grooves may traverse radially into the sleeve the majority of the way through the thickness thereof. Optionally, the grooves 51 may also include a slight spiral form to help in redistribution of any lubricant used. The presence of ribs 53 allows the member 48 to be easily precompressed to the appropriate level. Upon assembly of the member assembly 28 into the housing 24, the elastomer sleeve 48 is precompressed radially in the range of between about 5% and about 15%, and more preferably by about 8%. This precompression allows the sleeve 48 to be in contact with the wall 34 (FIG. 2) for all temperatures within the designed operating range (approximately −30F to 150F) and provide acceptable damping levels. Preferably, the elastomer sleeve 48 includes ribs 53 thereon which exhibit a shape factor SF, defined as the load area divided by the bulge area of between about 0.3 to about 1.2. This is approximately achieved when the ribs 53 formed on the elastomer sleeve 48 exhibit a width W-to-height H ratio of about 0.6 to about 2.4. This shape factor and the level of precompression synergistically achieves the outstanding damping force stability for the broad range of temperatures as is demonstrated by actual test curves shown in FIGS. 7–9. Suitable materials for the elastomer element 48 include Natural rubber, blends of Natural and Synthetic rubber, Butadiene-Styrene rubber, Nitrile, Butyl, Silicone, Neoprene, or any other suitable elastomeric material which is substantially incompressible and elastic. Most preferably, a natural rubber material of a shear modulus of about 115 psi (about 50 Shore A Durometer) is found to exhibit the combination of good abrasion characteristics and low drift desired for long term stability. To enhance the smoothness of the damper, a lubricant is utilized on the interior surface 34 and the sleeve 48. The preferred lubricant for use with preferred natural rubber is a silicone grease with a filler, such as Fluorocarbon Gel 880 available from NYE Lubricants. This type of lubricant is preferable because it stiffens by a desirable amount at low temperatures to offset the otherwise somewhat lower damping provided because of the slight shrinkage of the elastomer member 48 thereby providing excellent temperature stable damping.

FIG. 6 illustrates the elastomer damper 20 in accordance with the present invention installed in the environment of a landing gear assembly 10. The landing gear assembly 10 includes lower 11 and upper 12 strut tubes which reciprocate axially relative to one another providing suspension between the nose wheel 17 and the aircraft structure (not shown). As should be recognized, the aircraft structure is rigidly secured to the upper strut tube 12. A steering collar 14 is mounted on and surrounds the upper tube 12 and may freely rotate about the tube 12. A torque link assembly 13 consisting of two interdigitating links forms an interconnection which torsionally attaches the collar 14 to the lower tube 11 such that steering inputs into the collar 14 from the steering tubes 15 rotate the lower tube 11 and the wheel 17 to steer the aircraft. Shimmy of the wheel 17 during takeoff, landing, and maneuvers is appropriately damped by the damper 20 which cooperates between the upper and lower tubes 11, 12. The damper 20 is preferably mounted between a bracket 16 rigidly connected to, and depending from, the upper tube 12, and a similar bracket 19 depending from the collar 14. A clevis 62a (FIG. 1) formed on the housing 24 is received over the bracket tang 19 extending laterally from the collar 14 and is pivotally secured to the tang 19 with a shoulder bolt or other suitable fastener thereby forming a pivot joint thereat. Likewise, a clevis member 62b formed by an end cut on the end of shaft 30 is received over the bracket 16 extending from the lower end of tube 12 and is fastened thereto by an appropriate fastener thereby also forming a pivot joint.

Figure 7:
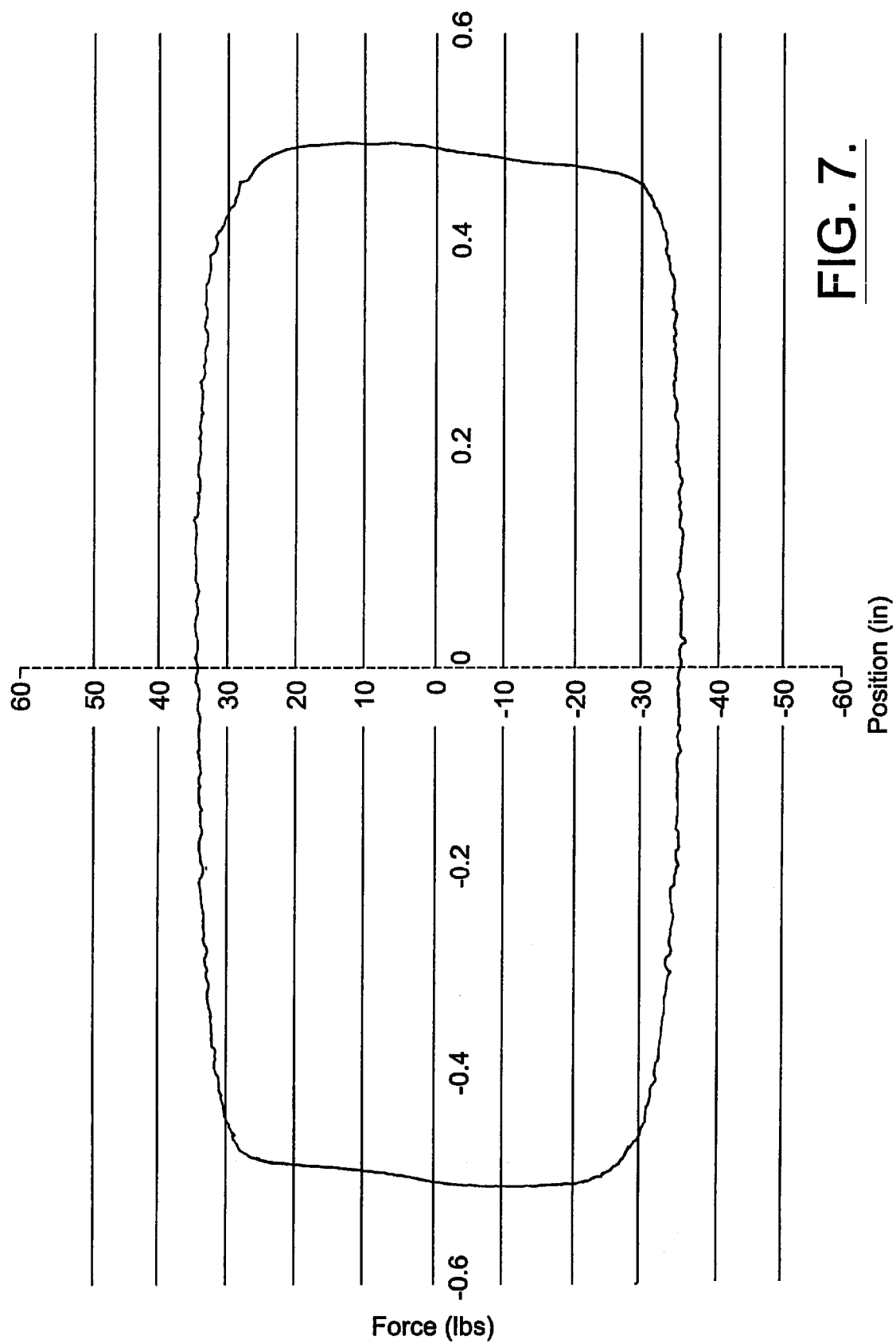
FIG. 7 is a representative performance plot at room temperature of the elastomer damper of FIG. 1 according to the present invention.

FIG. 7 illustrates a representative force versus position performance plot for the present invention elastomer damper 20. The plot is taken at room temperature, at 1 Hz, and at +/−0.5 inch (+/−12.7 mm) which is representative of a dynamic input condition for the aircraft landing gear application during taxi, for example. As can be seen, for the representative damper, a damping value of about +/−35 lb. (+/−1.557 Newtons) is generated. More damping force may be generated by appropriate sizing and precompression of the elastomer element 48 utilized therein. As should be recognized, the damping force is also very linear along its axial excursion.

Figure 8:
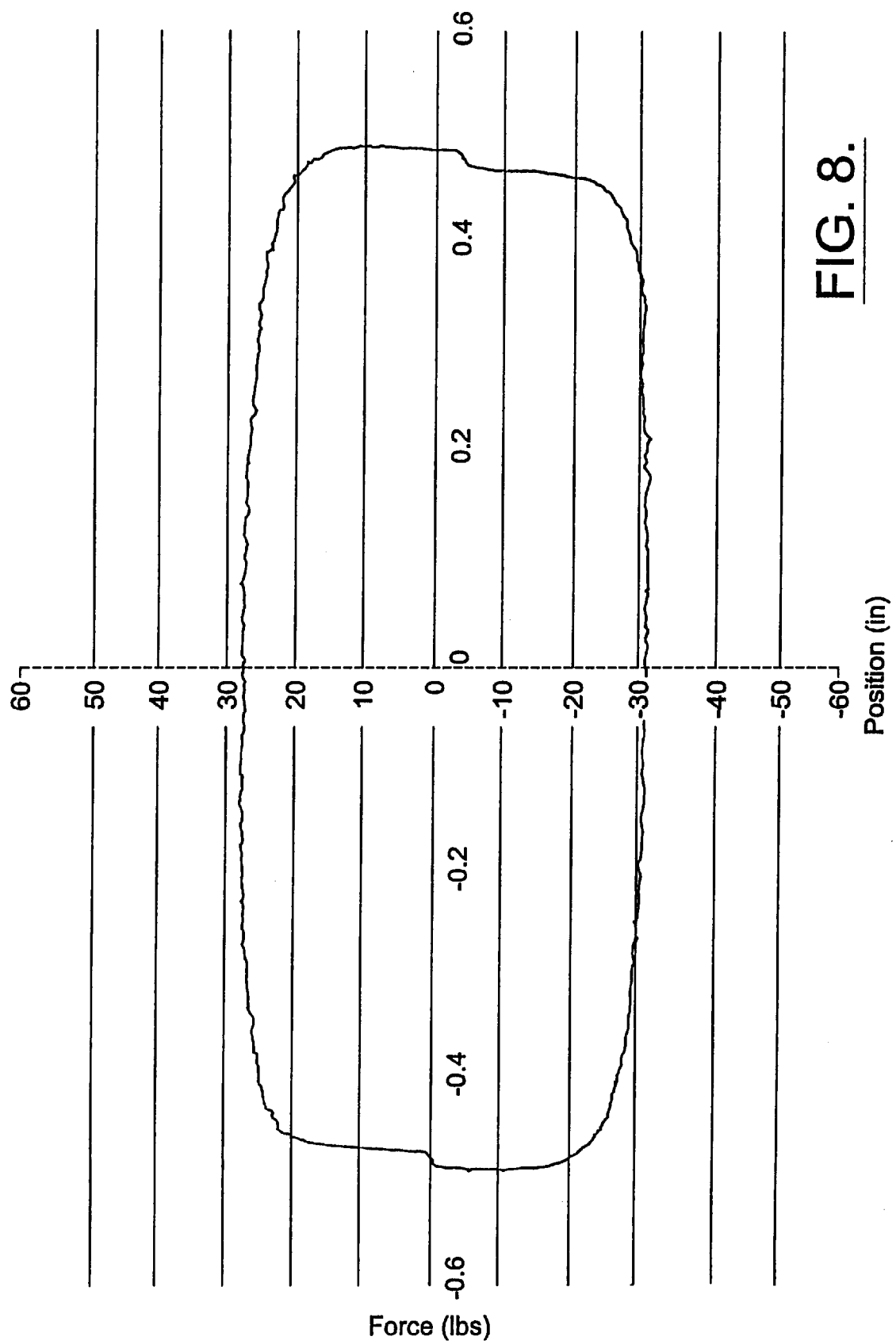
FIG. 8 is a representative performance plot at 150 degrees F of the elastomer damper of FIG. 1 according to the present invention.
Figure 9:
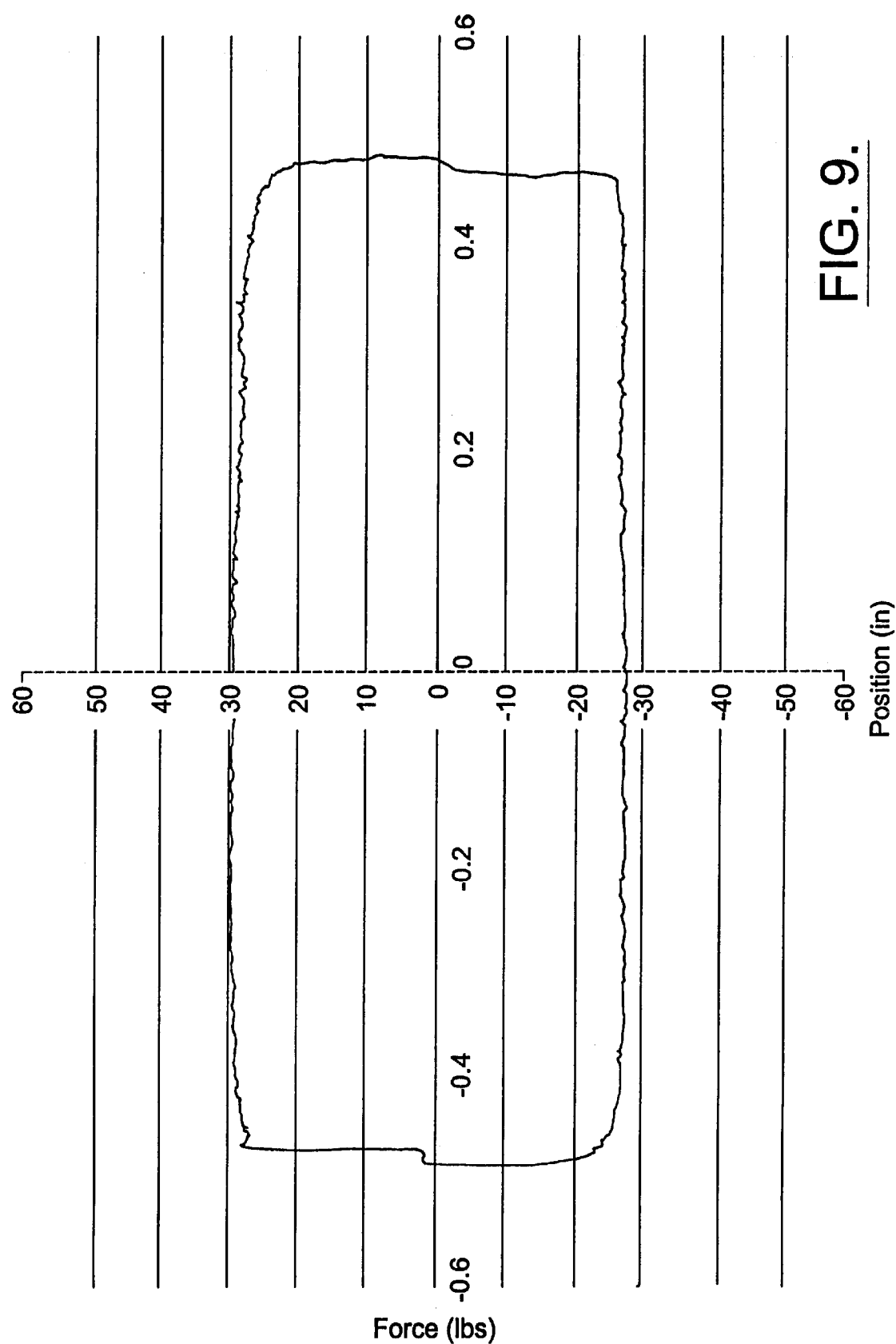
FIG. 9 is a representative performance plot at minus 30 degrees F of the elastomer damper of FIG. 1 according to the present invention.

FIGS. 8 and 9 demonstrate similar performance plots at 1 Hz and 0.5 inch (+/−12.7 mm) and at high temperature (150 degrees F) and low temperature (minus 30 degrees F), respectively. It should be recognized that the damping values generated are remarkably consistent over the entire temperature range.

Figure 10:
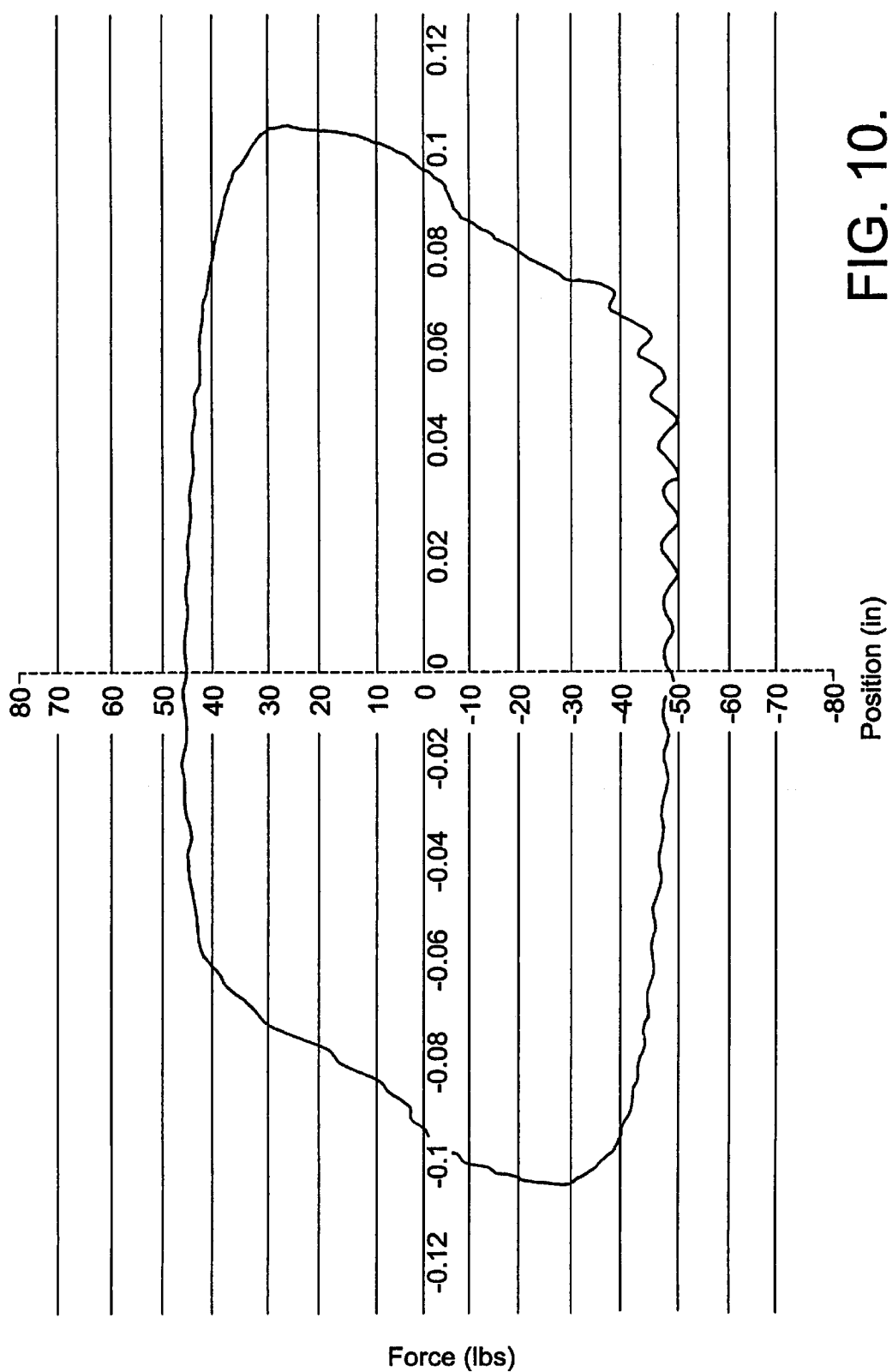
FIG. 10 is a representative performance plot at room temperature and 15 Hz of the elastomer damper of FIG. 1 according to the present invention.

FIG. 10 demonstrates a performance plot at 15 Hz and 0.1 inch (+/−2.5 mm) and at room temperature (68 degrees F) which is representative of a shimmy condition during takeoff, landing, etc. It should be recognized that the damping force desirably increases slightly with increased frequency.

Referring now to the embodiment of FIGS. 11–13, there is shown an elastomer damper 120 having a piston head assembly 132 coaxially mounted on a reduced diameter end portion 54 of shaft 30 and reciprocative within housing 24. The other end of shaft 30 extends through opening 41. Piston head assembly 132 includes a rigid cylindrical support element 146 with an annular recess 147 receiving step 56 of shaft 30 and is secured in place by locknut 58.

An annular elastomeric element 148 is bonded with a suitable adhesive, such as Lord Chemlok 205 and 220, around the outer surface of support element 146. This construction minimizes design cost by eliminating washers 50a, 50b, 54a and 54b as required in member assembly 28 above, increases the damping forces by adding usable surface area at piston assembly 132, and improves performance at low displacements. In the illustrated embodiment, elastomeric element 148 defines a single helical rib 149 formed by a continuous helical groove 151 of generally v-shape in cross section to provide communication between opposite chambers 24a and 24b of housing 24. It is contemplated that element 148 may comprise a plurality of grooves 151 to form a like number of ribs 149 without departing from the invention. The outside diameter of element 148 in an uncompressed state is slightly larger than the inside diameter of housing 24. A lubricant which is compatible with element 148, preferably a silicone grease with a low friction filler, is applied on the interior surface of housing 24 to enhance smoothness of operation.

Elastomer element 148 is made of material similar to that of elastomer element 48 except it has a shear modulus within the range of about 100 psi and 200 psi (about 60 Shore A Durometer). Installed in housing 24, helical rib 149 is in compression in a radial direction in the range of about 5% to 15%, and preferably 10%, for a shape factor SF of about 1.2. This insures positive frictional contact at their interface over a broad range of temperatures.

Figure 14:
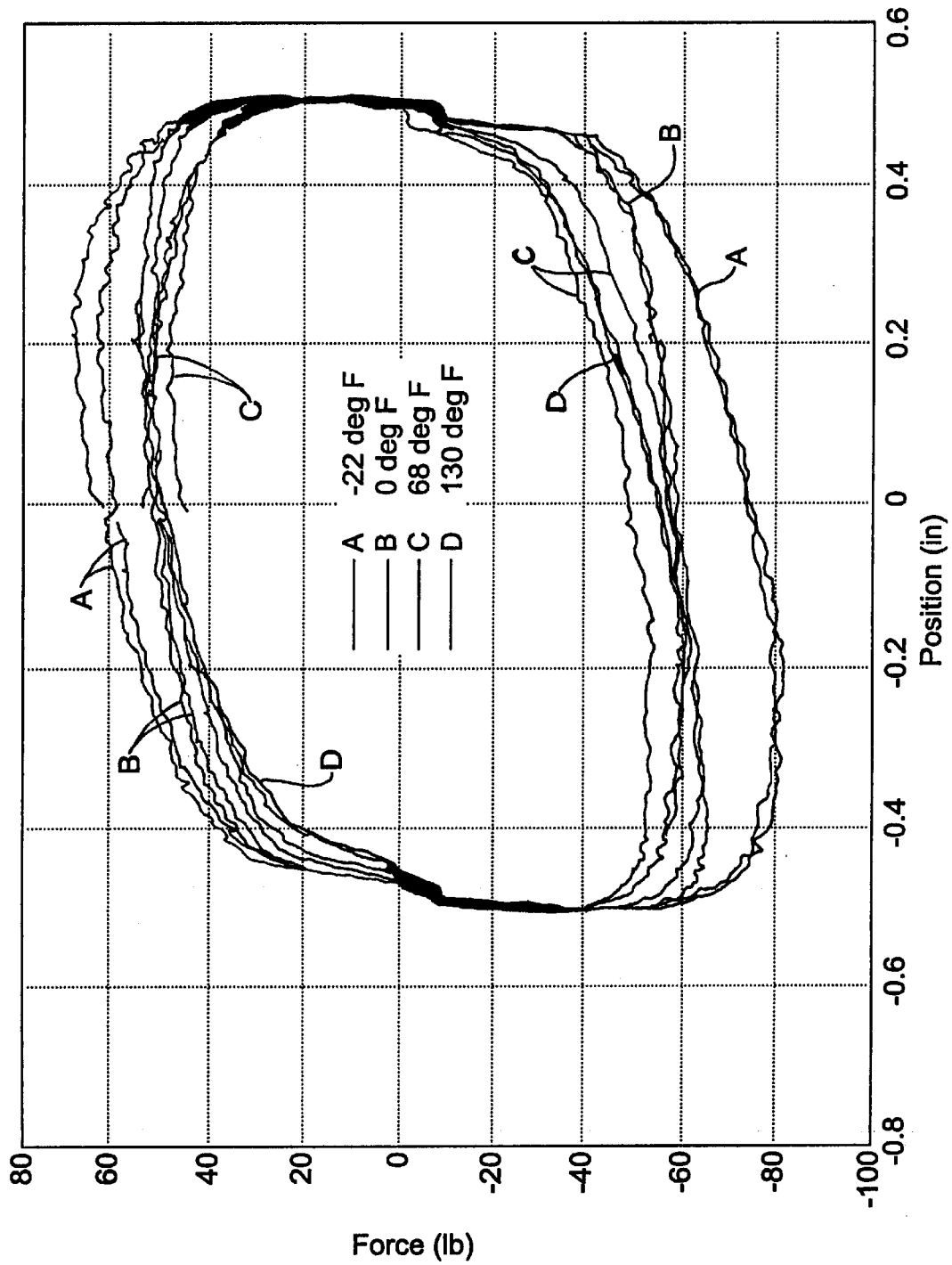
FIG. 14 are a representative performance plots at various temperatures of the elastomer damper of FIG. 11

Referring to FIG. 13, groove 151 may be configured with pitch P, groove angle α and root diameter $d_r$ for optimum distribution of lubricant and increased damping force pressures. An elastomer damper 120 actually constructed according to the invention for a damper housing 24 of inside diameter $d_i$=1.88 inches consisted of an elastomer element 148 of length L=1.552±0.010 inches (FIG. 11), inside diameter $d_e$=0.89 inch, outside diameter $d_o$=1.213±0.005 inches (radially compressed approximately 10%), pitch P=0.44, groove angle α=60±5 degrees, and root diameter $d_r$=0.972±0.005 inch. For this construction, FIG. 14 shows the force-displacement curves of the damper during a simulated input condition of an aircraft landing gear during taxi with displacements between about +0.5 inch and −0.5 inch at 1 Hz and at various operating temperatures. The plots A, B, C and D demonstrate that such a damper is relatively insensitive to temperature changes between −22° F. and +130° F., and that it is capable of producing high damping forces between +65 lbs. to −80 lbs for the simulated condition.

In summary, it should be apparent from the foregoing that the present invention comprises novel elastomer dampers which include a housing and a member assembly moveable relative thereto, where an elastomer element is received in interference fit relationship with the housing to generate temperature stable damping forces therebetween. The invention provides dampers and apparatus that are simpler, more robust, of equivalent performance, and less costly than prior devices.

While several embodiments including the preferred embodiments of the present invention have been described in detail, various modifications, alterations, changes, and adaptations to the aforementioned may be made without departing from the scope of the present invention defined in the appended claims. It is intended that all such modifications, alterations, and changes be considered part of the present invention.

What is claimed is:

1. An elastomer damper, comprising:
   a housing having a cylindrical interior surface;
   a piston head mounted on a shaft and reciprocative within said housing; and
   an annular elastomer element bonded around the periphery of said piston head and in frictional contact with said interior surface, said element having at least one continuous helical groove formed around the outer circumference thereof to form a like number of passages communicating between opposite ends of said housing.

2. The damper of claim 1 wherein elastomeric material has a shear modulus within the range of 100 psi and 200 psi.

3. The damper of claim 2 wherein said sleeve is radially compressed between said piston head and said interior surface in the range of between about 5% and 15%.

4. The damper of claim 2 wherein said sleeve is radially compressed between said piston head and said interior surface about 10%.

5. The damper of claim 2 wherein said sleeve has an elastomeric configuration providing a shape factor of about 1.2 for radial loading.

6. The damper of claim 2 wherein said helical groove in cross section is v-shaped.

7. The damper of claim 6 wherein said housing has an inside diameter of about 1.88 inches, said elastomer element uncompressed has an outside diameter of about 1.213 inches, said groove has a root diameter of about 0.972 inch, and a groove angle in cross section of about 60 degrees.

8. The damper of claim 7 wherein the pitch of said groove is about 0.44 inch.

9. The damper of claim 1 wherein said interior surface includes a lubricant film.

10. A piston assembly for a vibration damper, the damper having a cylindrical housing of predetermined inside diameter, said piston assembly comprising:
    a cylindrical piston head formed to reciprocate within said housing; and
    an elastomer sleeve bonded to the circumference of said piston head and in frictional contact with said housing, said piston head comprising a continuous helical groove around the periphery thereof to form at least one passage communicating between opposite ends of the housing, said sleeve having an uncompressed outside diameter radially compressed in the range of about 5% and 15% to the inside diameter of said housing.

11. The piston assembly of claim 9 wherein said elastomer element has an inside diameter of about 0.89 inch, and an outside diameter of about 1.213 inches.

12. The piston assembly of claim 10 wherein said groove has a pitch of 0.44 inch.

13. The piston assembly of claim 10 wherein said groove in cross section is v-shaped with a root diameter of about 0.972 inch, and an angle of about 60 degrees.

* * * * *